(12) United States Patent
Fowler et al.

(10) Patent No.: US 12,291,366 B2
(45) Date of Patent: May 6, 2025

(54) PACKAGING

(71) Applicant: ROCKIT GLOBAL LIMITED, Hamilton (NZ)

(72) Inventors: Andrew Vernon Fowler, Hamilton (NZ); Ryan Douglas Tasma, Hamilton (NZ); Shane Timothy Daly, Hamilton (NZ)

(73) Assignee: Rockit Global Limited, Hamilton (NZ)

(*) Notice: Subject to any disclaimer, the term of this patent is extended or adjusted under 35 U.S.C. 154(b) by 46 days.

(21) Appl. No.: 18/255,456

(22) PCT Filed: Dec. 1, 2021

(86) PCT No.: PCT/NZ2021/050214
§ 371 (c)(1),
(2) Date: Jun. 1, 2023

(87) PCT Pub. No.: WO2022/119458
PCT Pub. Date: Jun. 9, 2022

(65) Prior Publication Data
US 2024/0002084 A1 Jan. 4, 2024

(30) Foreign Application Priority Data
Dec. 1, 2020 (NZ) .................................. 770536

(51) Int. Cl.
*B65B 5/10* (2006.01)
*B25J 9/00* (2006.01)
(Continued)

(52) U.S. Cl.
CPC ............ *B65B 5/105* (2013.01); *B25J 9/0093* (2013.01); *B25J 9/1669* (2013.01);
(Continued)

(58) Field of Classification Search
CPC .. B65B 5/105; B65B 5/04; B65B 5/10; B65B 5/12; B65B 25/04; B65B 43/54;
(Continued)

(56) References Cited

U.S. PATENT DOCUMENTS

| 4,936,816 | A | * | 6/1990 | Blumle | .................... B65B 43/39 |
| | | | | | 493/441 |
| 5,010,715 | A | * | 4/1991 | Fluck | ...................... B65B 23/12 |
| | | | | | 53/502 |

(Continued)

FOREIGN PATENT DOCUMENTS

WO  WO 2019/136530 A1  7/2019

OTHER PUBLICATIONS

International Search Report received in International Application No. PCT/NZ2021/050214, dated Jun. 9, 2022.

*Primary Examiner* — Stephen F. Gerrity
*Assistant Examiner* — Linda J Hodge
(74) *Attorney, Agent, or Firm* — Knobbe, Martens, Olson & Bear, LLP

(57) ABSTRACT

A produce packing device comprising: a robot positioning apparatus with an end effector, wherein the robot positioning apparatus provides at least three degrees of freedom to move the end effector in three axial (x, y and z) directions or combination of at least two of these directions with respect to items of produce to be packaged, wherein the end effector is adapted in use for individually picking up an item of produce; a sensor to determine a size of each item of produce in a plurality of items of produce presented to the robot positioning apparatus and end effector; and a controller configured to receive one or more outputs from the sensor and: determine a selection of items of produce to be picked from the plurality of items of produce based on the one or more outputs from the sensor to achieve an acceptable stack height of items of produce within a package; and cause the (Continued)

robot positioning apparatus and end effector to move and pick up the selection of items of produce and place within said package.

26 Claims, 10 Drawing Sheets

(51) Int. Cl.
*B25J 9/16* (2006.01)
*B25J 11/00* (2006.01)
*B65B 25/04* (2006.01)
*B25J 15/00* (2006.01)

(52) U.S. Cl.
CPC ............ *B25J 11/0045* (2013.01); *B65B 25/04* (2013.01); *B25J 15/0019* (2013.01)

(58) Field of Classification Search
CPC ......... B65B 43/56; B65B 35/24; B65B 35/16; B25J 9/0093; B25J 9/1669; B25J 11/0045; B25J 15/0019
USPC ......... 53/473, 475, 498, 504, 244, 242, 243, 53/541
See application file for complete search history.

(56) References Cited

U.S. PATENT DOCUMENTS

| | | | | |
|---|---|---|---|---|
| 5,403,056 | A * | 4/1995 | Wallace | A22C 17/0093 294/98.1 |
| 6,640,523 | B2 * | 11/2003 | Jones, Jr. | B65B 57/14 53/154 |
| 6,662,534 | B2 * | 12/2003 | Straub | B65B 43/52 53/540 |
| 6,711,873 | B2 * | 3/2004 | Cheung | H01L 21/67271 53/247 |
| 7,694,492 | B2 * | 4/2010 | Van Ballegooijen | B65B 23/02 53/473 |
| 2010/0326893 | A1 | 12/2010 | Hueppi et al. | |
| 2015/0059290 | A1 * | 3/2015 | Ewert | B65B 35/16 53/64 |
| 2015/0259088 | A1 | 9/2015 | Liedl | |
| 2018/0297727 | A1 * | 10/2018 | Hartley | B65D 43/0231 |
| 2019/0076883 | A1 | 3/2019 | Njluland et al. | |
| 2019/0143542 | A1 | 5/2019 | Scarfe et al. | |
| 2020/0156260 | A1 | 5/2020 | Takasaki et al. | |

* cited by examiner

PACKAGING

APPLICATIONS

This application is based on the Provisional specification filed in relation to New Zealand Patent Application Number 770536, the entire contents of which are incorporated herein by reference.

TECHNICAL FIELD

The invention relates to an apparatus for packaging objects in a tube, and in particular, for packing items of produce such as fruit or other perishable/food items in a tube.

BACKGROUND ART

Apples and other items of fruit are traditionally packaged in boxes. To minimize damage to fruit, typically fruit is supported in a tray within a box to keep fruit separated from adjacent fruit. A single box may include one or more layers of fruit, with each layer supported by a tray.

The applicant introduced a novel approach to packaging fruit (apples), by packing apples in a tube rather than in trays in a box Each tube typically contains two or more items of fruit, for example five apples.

The tube may be cylindrical in shape or may have over shapes in cross section, for example square, triangular or other shape An inner dimension of the tube is commensurate with an outer dimension of the fruit so that when full, the tube contains a single row or column of fruit.

For example, in a cylindrical tube, an inner diameter of the tube is preferably slightly larger than a maximum expected diameter of the fruit. The expected maximum diameter of fruit may be based on a known distribution of fruit size for a particular variety and/or type of fruit.

Packing fruit in a tube can introduce inefficiencies in the packing process. Each item of fruit cannot be dropped into the tube, since physical impacts between fruit, can cause damage to the fruit during packing (bruising).

Also, unlike packing fruit in a box, each item of fruit must be separately added to the tube one at a time. Accordingly, this form of packaging/packing process is time consuming, labour intensive and adds further costs to the packing process.

A further issue with the packing of fruit in a tube is that natural variability in fruit size can result in variances the amount of empty headspace at the top of the tube. Ideally the amount of empty headspace within the tube should be kept to a minimum, to avoid fruit rolling around or moving too much within the tube.

For example, fruit packaged in a tube that is too long (i.e., a tube with too much empty headspace) can during transportation, result in the fruit moving significantly within the tube, and impacting adjacent fruit resulting in damage.

Where several smaller items of fruit are packed together in a tube, the headspace at the top end of the tube may be too large—such that the tube looks empty, and there is too much room for fruit movement within the tube and consequential damage thereto.

Conversely, a desired number of items of fruit may be too large to fit within a tube requiring the packing process to be restarted once the tube is emptied.

In order to manage the amount of empty headspace within a tube, a tube with a variable length may be provided, for example a tube that has two opposing portions that telescope/slide together to vary a tube length. A tube comprising multiple parts may add further cost and/or complexity to the packaging of fruit.

All references, including any patents or patent applications cited in this specification are hereby incorporated by reference No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

DISCLOSURE OF THE INVENTION

It is an object of the present invention to address one or more of the foregoing problems or at least to provide the public with a useful choice.

According to one aspect of the present invention there is provided a produce packing device comprising:
  a robot positioning apparatus with an end effector,
  wherein the robot positioning apparatus provides at least three degrees of freedom to move the end effector in three axial (x, y and z) directions or combination of at least two of these directions with respect to items of produce to be packaged,
  wherein the end effector is adapted in use for individually picking up an item of produce;
  a sensor to determine a size of each item of produce in a plurality of items of produce presented to the robot positioning apparatus and end effector; and
  a controller configured to receive one or more outputs from the sensor and:
    determine a selection of items of produce to be picked from the plurality of items of produce based on the one or more outputs from the sensor to achieve an acceptable stack height of items of produce within a package;
    and cause the robot positioning apparatus and end effector to move and pick up the selection of items of produce and place within said package.

In some embodiments, the acceptable stack height is defined by a target stack height and/or an acceptable stack height range, wherein the acceptable stack height range is from a minimum acceptable stack height to a maximum acceptable stack height.

In some embodiments, once packaged, each item of produce assumes a position within the package, and a said acceptable stack height range and/or target stack height is defined for the items of produce at each position within the package.

In some embodiments, the controller is configured to:
  (i) determine, based on the one or more outputs from the sensor, the size (height) of each item of produce in a present subset of the plurality of items of produce and determine from the present subset the selection of items of produce to be picked up by the robot positioning apparatus with end effector.

In some embodiments, the device comprises a conveyor to convey the plurality of items of produce to the robot positioning device and the present subset of items of produce is a row of items of produce spaced apart across the conveyor.

In some embodiments, the controller is configured to track the row of items of produce as the row is conveyed along the conveyor.

In some embodiments, the controller is configured to determine the size of each item of produce in more than one row of items of produce, and track the rows of items of produce as the rows are conveyed along the conveyor.

In some embodiments, the controller is configured to:
(ii) evaluate the heights of the items of produce in the present subset to determine if there is one or more selections of one or more items of produce from the present subset to achieve a stack height within an acceptable stack height range; and
(iii) if there is a single selection of one or more items of produce within the acceptable stack height range, the controller is configured to cause the robot positioning apparatus and end effector to pick up the single selection of one or more items of produce.

In some embodiments:
(iii)(b) if there is no selection of items of produce that is within the acceptable stack height range, and:
 (iii)(b)(i) if the stack height of the items of produce in the present subset is greater than a maximum acceptable stack height, the controller is configured to disregard the largest item of produce from the present subset, or
 (iii)(b)(ii) if the stack height of the items of produce in the present subset is less than a minimum acceptable stack height, the controller is configured to disregard the smallest item of produce from the present subset, and
(iii)(c) if there is more than one item of produce left in the present subset, the controller is configured to return to step (ii).

In some embodiments, in step (iii)(c) the controller is configured to:
if there is only one item of produce left in the present subset (the last item of produce in the present subset), and
(iii)(c)(i) if the last item of produce in the present subset is within the acceptable stack height range, the controller is configured to:
 cause the robot positioning device and end effector to pick up the last item of produce in the present subset.

In some embodiments, in step (iii)(c) the controller is configured to:
(iii)(c)(ii) if the last item of produce in the present subset is outside the acceptable stack height range, the controller is configured to:
 (iii)(c)(ii)(a) determine, based on the one or more outputs from the sensor, the size (height) of each item of produce in one or more next subsets to determine if there is an item of produce in the one or more next subsets to achieve, together with the last item of produce, a stack height within the acceptable stack height range, and
  (iii)(c)(ii)(a)(i) if there is an item of produce in the one or more next subset(s) to achieve, together with the last item of produce, a stack height within the acceptable stack height range, the controller is configured to:
   cause the robot positioning apparatus and end effector to pick up the last item of produce in the present subset, and
  (iii)(c)(ii)(a)(ii) if there is no item of produce in the one or more next subset(s) to achieve, together with the last item of produce, a stack height within the acceptable stack height range, the controller is configured to:
   set a next subset in the plurality of items of produce to be the present subset and returns to step (i).

In some embodiments, following step (ii), if there is more than one selection of one or more items of produce from the present subset to achieve a stack height within an acceptable stack height range, the controller is configured to:
(iv) determine if one or more of the selections of one or more items of produce achieves a stack height that is the closest to or is equal to a target stack height, and
(iv)(a) if there is only one selection of one or more items of produce that achieves a stack height that is the closest to or equal to the target stack height, the controller is configured to cause the robot positioning apparatus and end effector to pick up that selection; and
(iv)(b) if there is more than one selection of one or more items of produce that achieves a stack height that is the closest to or equal to the target stack height, the controller is configured to cause the robot positioning apparatus and end effector to pick up the selection with the largest or smallest item of produce.

In some embodiments, a stack height of a selection of one or more items of produce is equal to the target stack height if the stack height of the selection is equal to the target stack height plus or minus a threshold.

In some embodiments, after the controller causes the robot positioning apparatus to pick up a said selection of one or more items of produce, the controller is further configured to:
(v) determine if the package is full, and
 (v)(a) if the package is not full, the controller is configured to set a next subset in the plurality of items of produce to be the present subset and return to step (i) to continue filling the package.

In some embodiments, the end effector is adapted in use for holding the package and places the item of produce therein as a consequence of the end effector picking up said item of produce, and wherein, in step (v):
 (v)(b) if the package is full, a present packing operation is completed, and the controller is configured to cause the robot positioning apparatus to move the end effector to a release area and release the full package from the end effector.

In some embodiments, the controller is configured to:
 (v)(c) cause the robot positioning apparatus to move the end effector to a package dispenser to receive an empty package in the end effector, and
 set a next subset in the plurality of items of produce to be the present subset and return to step (i) to commence filling the empty package.

In some embodiments, the end effector is adapted in use for holding the package and places the item of produce therein as a consequence of the end effector picking up said item of produce, and the end effector comprises:
at least one actuatable movable element located on the end effector so as to be adjacent the open end of a tube held by the end effector;
wherein the actuatable movable element is configured to be operable between:
 an extended position which at least partially extends over the open end of a tube held by the end effector to at least partially obstruct the open end of the tube; and a retracted position so that the open end of the container is substantially unobstructed to allow items of produce to be received in the tube; and wherein, to pick up an item of produce, the controller is configured to, with the actuatable element in the retracted position, with an empty tube to be filled, as follows:

A) control the robot positioning apparatus to position the end effector, in at least:
  x and y directions; or
  a combination thereof;
so as to be vertically above a first item of produce of a said selection of one or more items of produce; and move the end effector vertically downwards to receive the first item of produce in the tube within the end effector, and B) actuate the actuatable movable element from the retracted position to the extended position to retain the first item of produce in the package, and C) cause the robot positioning apparatus to move the end effector vertically upwards to thereby pick up the item of produce.

In some embodiments, the controller is further programmed to:

D) cause the robot positioning apparatus to move the end effector in the x and y directions to position the end effector vertically above a further item of produce in the selection of one or more items of produce, and move the end effector vertically downwards to position the first item of produce adjacent or in contact with the further item of produce;

E) actuate the actuatable movable element from the extended position to the retracted position;

F) control the robot positioning apparatus to continue to move the end effector vertically downwards to receive the further item of produce in the package within the end effector;

G) actuate the actuatable movable element from the retracted position to the extended position to retain the first item of produce and the further item of produce in the package, and H) cause the robot positioning apparatus to move the end effector vertically upwards, and F) repeat steps D to H until the robot positioning apparatus and end effector has picked up the selection of one or more items of produce.

In some embodiments, the device comprises a conveyor to convey the plurality of items of produce to the robot positioning device with end effector, and the subset of items of produce is a row of items of produce spaced apart across the conveyor, and wherein, to position the end effector vertically above an item of produce, the controller is configured to:

to cause the robot positioning apparatus to move the end effector vertically above an item of produce and move in a conveying direction at a speed of the conveyor so that the end effector remains vertically above the item of produce.

In some embodiments, the end effector is adapted in use for holding the package and places the item of produce therein as a consequence of the end effector picking up said item of produce.

In some embodiments, the device comprises a singulation unit to space apart the items of produce and present singulated items of produce to a reach envelope of the robot positioning apparatus.

In some embodiments, the singulation unit spaces the items of produce apart in a 2-dimensional array.

According to another aspect of the present invention there is provided a method of packaging items of produce directly into a tube-like container comprising the steps of:

a) sensing dimensional and shape data for items of produce, located on a conveyor, at discrete non-variable datapoint locations thereon, at given point of time;

b) evaluating the dimensional and shape data of the items of produce on the conveyor, as determined at step a), to identify whether there are one or more items on the conveyor, that will achieve a stack height within an acceptable height range, from the minimum to the maximum stack height, for the tube-like container.

In some embodiments, the method comprises the further step of:

c) using datapoint locations from step a) of identified items of produce to:
  i) move a robot positioning device so as to remain positioned directly above a selected item of produce; and
  ii) manipulate an end effector so the tube-like container can receive and retain said item of produce therein.

In some embodiments, the method comprises the further step of:

d) repeating steps a) through c) as required until the tube-like container is filled with the desired number of items of produce.

According to another aspect of the present invention there is provided a method of packaging items comprising the step of:

a) utilising a robot positioning apparatus to manipulate an end effector thereon to pick up a discrete item of produce from a conveyor and deliver directly into a tube-like package after sensing the dimensions and shape of the discrete item of produce.

In some embodiments, the method comprises the further step of:

b) repeating step a) to pick up one or more further items of produce until the tube-like package is full.

According to another aspect of the present invention there is provided a method of packaging items comprises the step of:

a) utilising a controller to manipulate the robotic positioning apparatus and end effector thereon to select an item, or items of produce, to be placed in the container, based on assessment of the individual dimensions, or individual dimensions and shape, or individual dimensions. shape, and orientation, and collective dimensions, collective dimensions and shape, or collective dimensions, shape, and orientation, of the item(s) of produce selected, so as to ensure an end result that the items of produce collectively fit within the container within a target stack height.

In some embodiments, the method comprises the further step of wherein the assessment of the collective dimensions, collective dimensions and shape, or collective dimensions, shape, and orientation are used to determine the order in which items of produce are packed into a tube.

According to another aspect of the present invention there is provided an end effector for a robot positioning device which includes:

a frame which can receive and retain a tube-like container therein;

said end effector including an actuatable element which can move between and extended and retracted position;

wherein the end effector is operated to open (if not already) from the extended position to the retracted position to receive, or retain, a new item of produce therein;

wherein at the same time, just prior, or just subsequent, to the operation of the end effector moving to the retracted position; or at, or near the start, of the end effector moving downwardly to receive a new item of produce, a vibrating mechanism which vibrates, both the end effector and tube-like container therein, is activated.

According to another aspect of the present invention there is provided a sensor system for a tube packaging operation which is configured to:
a) have at least one sensor track and record multiple measurements over a period of time including: width; length; as well as orientation information; for individual items of produce on a conveyor;
b) calculate minimum and maximum width/height dimensions for an item to assist with determining stack height for a tube within an acceptable margin of error.

In some embodiments, the sensor system for a tube packaging operation is also configured to:
c) identify outlier fruit not compatible with packaging constraints of the tube so they can be removed from the conveyor and/or disregarded by the robot positioning apparatus.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

Definitions

Hereinafter, the term 'robot' is to be understood as meaning manipulators or industrial robots which have one or more joints, which in particular can perform translatory and/or rotational movements, such that one or more end-effectors of a robot have different positions (spatial positions or positions). Translational and/or rotational movements may include, movements along one or more rails on which parts/arms (links) of the robot are guided. Even such rails thus form joints in the sense of a kinematic chain, which describes the possibility of movement of a robot. The term 'robot' as used herein may be understood to mean an apparatus comprising a Cartesian robot/gantry robot, SCARA robot/horizontal articulated robot, cylindrical robot/cylinder coordinate robot, spherical robot/spherical coordinate robot, articulated robot. Generally, the term 'robot' or 'robot positioning apparatus' as used herein may be understood to mean an apparatus configured to move with at least three degrees of freedom, including three translational degrees of freedom, or an apparatus configured to move with at least three translational degrees of freedom and at least one rotational degree of freedom.

The term 'soft' as used herein refers to the ability of a material to yield to physical pressure.

The term 'resilient' as used herein refers to the ability of a material to return to its original shape after being deformed due to an applied force.

The term 'tube' as used herein refers to any elongate container which has a base one or more side walls and an open top and a hollow interior. Thus, the terms 'tube' and 'tube-like' can be used interchangeably and cover elongate containers with different cross-sections including circular, rectangular, triangular, pentagonal, hexagonal to name a few possible cross-sectional profiles.

BRIEF DESCRIPTION OF THE DRAWINGS

Further aspects of the present invention will become apparent from the ensuing description which is given by way of example only and with reference to the accompanying drawings in which.

BEST MODES FOR CARRYING OUT THE INVENTION

Figure 1:
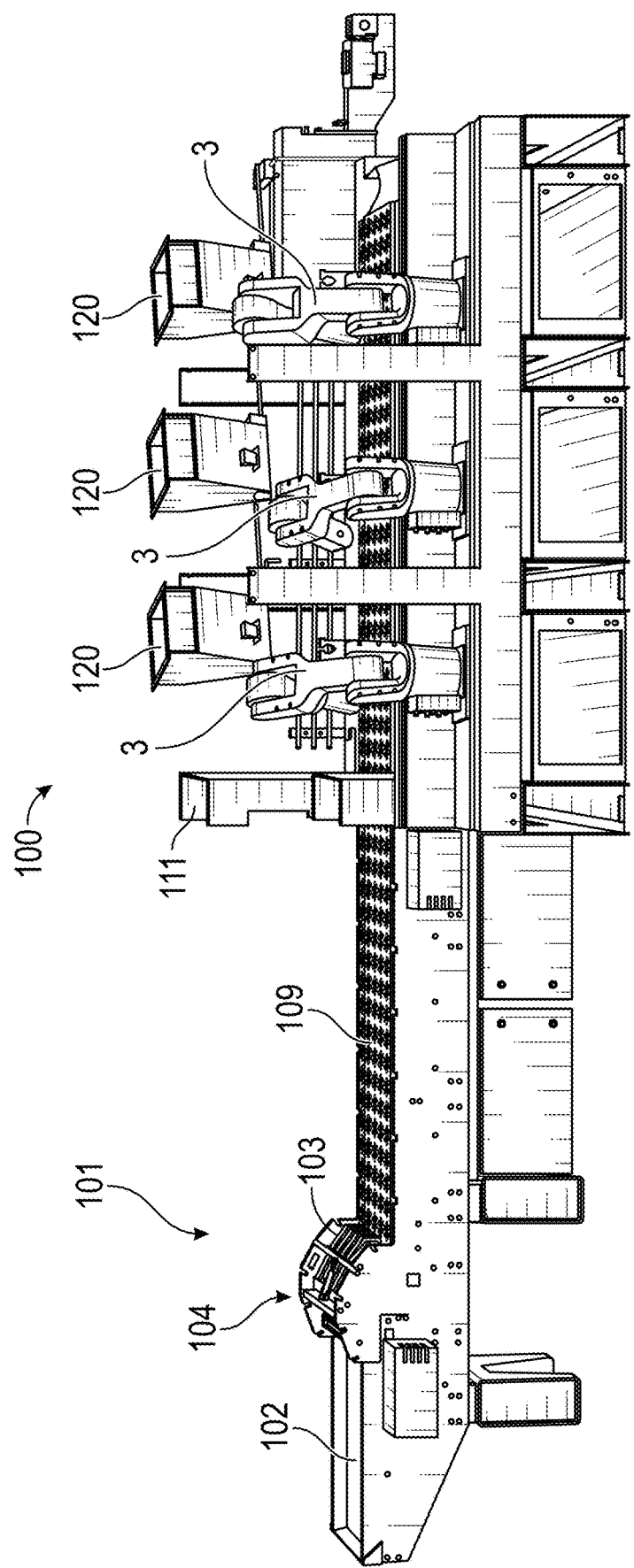
FIG. 1 illustrates a produce packing device for placing items of produce in tubular packages. The illustrated packing line is particularly adapted for packing apples.
Figure 2:
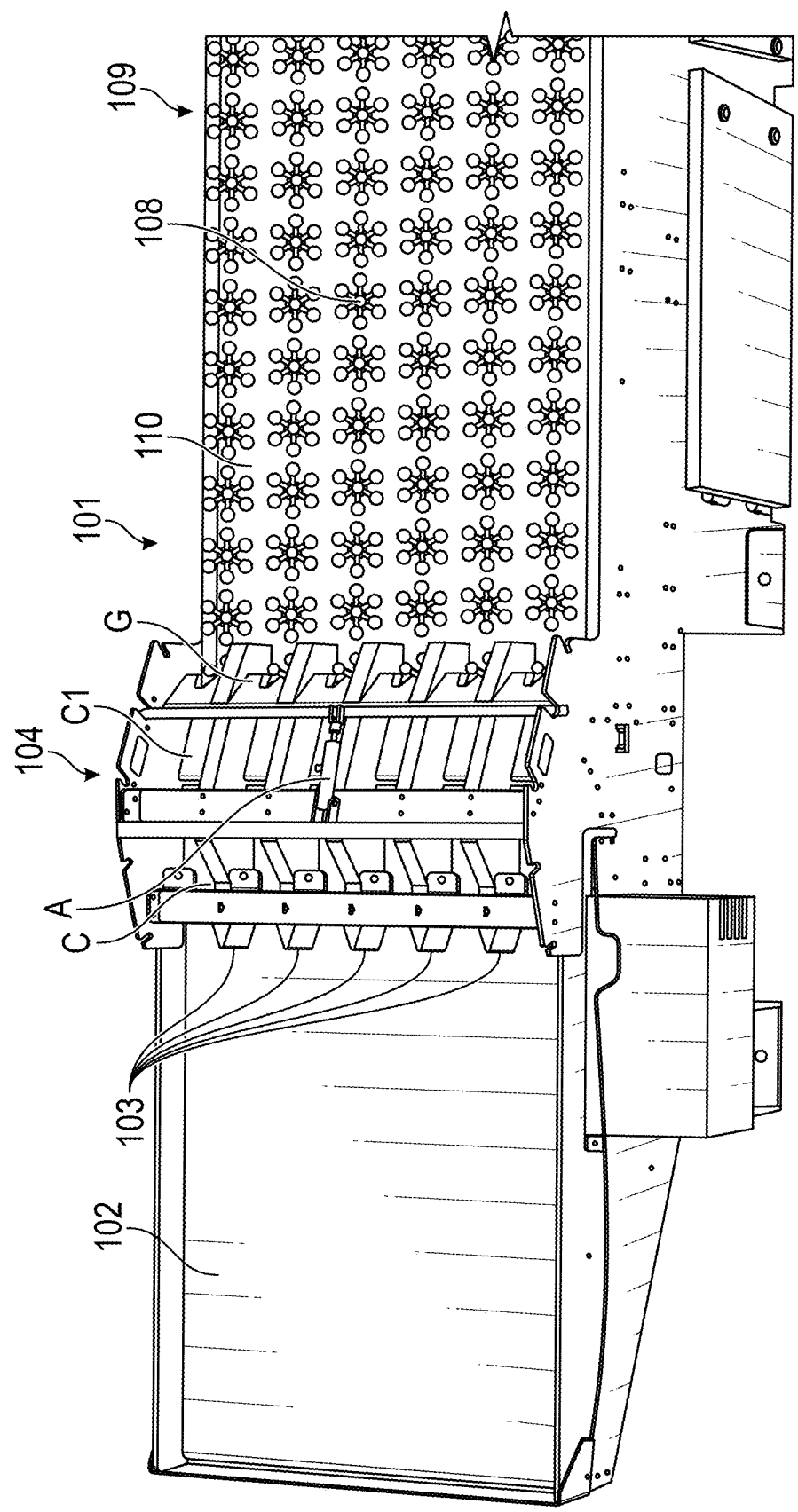
FIG. 2 illustrates a singulation unit of the produce packing device of FIG. 1, for singulating or separating items of produce into a 2-D array.
Figure 3:
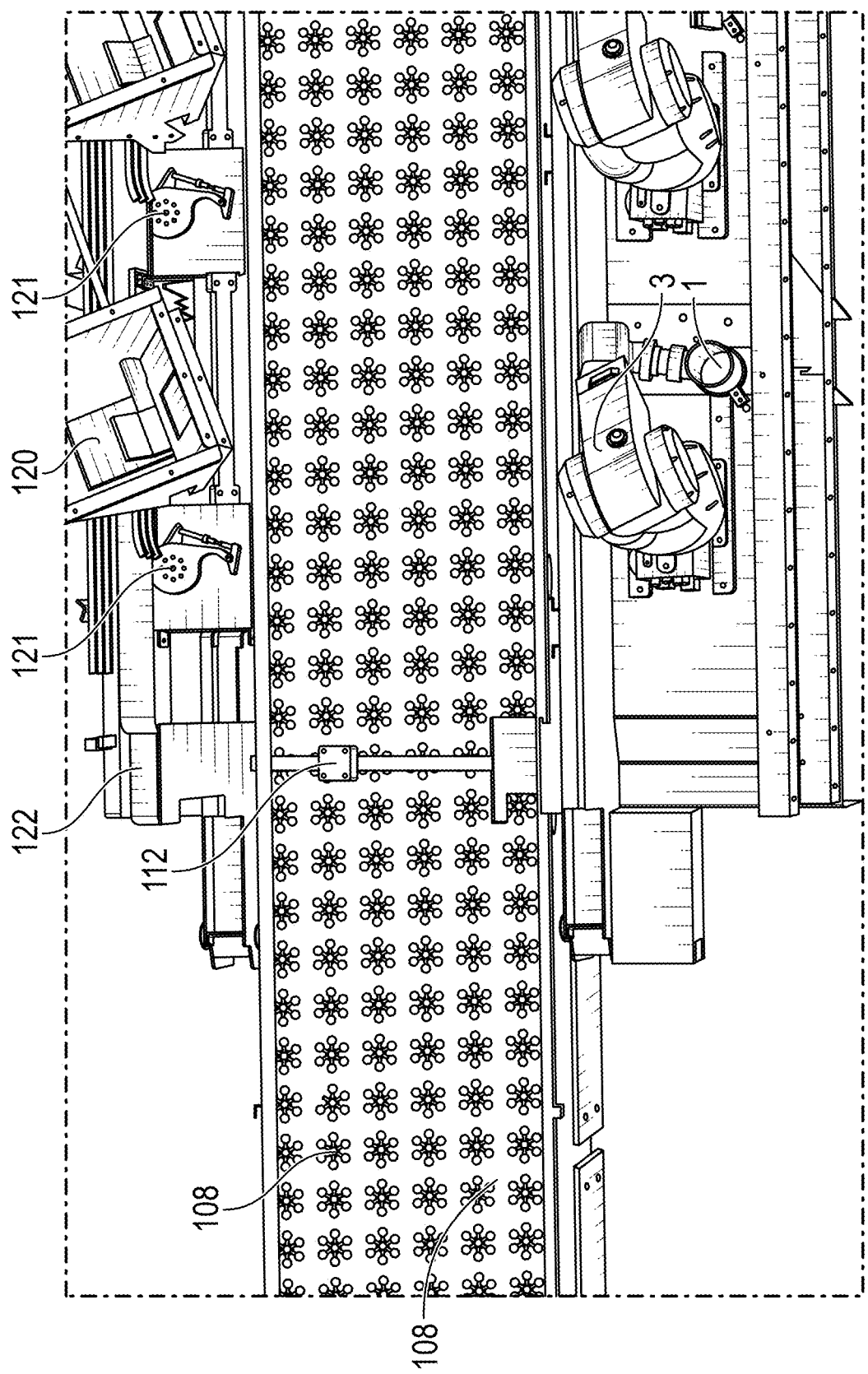
FIG. 3 illustrates a portion of the produce packing device of FIG. 1, including a robot positioning apparatus with end effector for picking items of produce for packing in a tubular package.

FIGS. 1 to 4 illustrate a produce packing device or system 100 for packing items of produce such as fruit in tubular packages. Preferably, the fruit is apples.

The producing packing device or system (herein the packing device) 100 comprises at least one robot positioning apparatus 3 with an end effector 1 (refer FIGS. 3 and 4) for placing the items of produce in a tubular package. The illustrated embodiment has three robot positioning apparatuses 3 each carrying an end effector 1. However, there may be one, two, three or more robot positioning apparatuses 3 with end effectors 1.

The illustrated device 100 comprises a singulation unit 101 configured to singulate (separate) the items of produce to be presented to the robot positioning apparatus 3 with end effector 1.

The singulation unit 101 separates the items of produce to space the produce apart in at least a line or row.

In the illustrated embodiment the singulation unit 101 separates the produce via line dividers 103 into six channels C to space the produce apart in two dimensions—i.e. spaced apart in a two-dimensional array.

Once in the channel C the produce encounters a wall section, which stops forward motion of the leading produce in channel on a lift section which has a top surface on which fruit sit inclined downwardly in the downstream direction. The lift section spans across the base of channels C and is operated to raise the lead produce adjacent the wall to deliver via the sloped top surface thereof to a downward ramp section C1 which has a gate G at the end thereof. This lifting operation is timed to occur, just after the gate G has opened, to release items of produce into the holders 108.

Preferably, the ramp is made of Teflon a high friction surface so as to help slow the descent of the produce.

As mentioned the release of produce from the downstream end of the channels C is controlled by the gate G—which is opened and closed by an actuator A—so that items of produce in channels C can be released at timed intervals into holders 108. This is further described below.

The items of produce are then spaced apart in x and y directions.

The singulation unit 101 comprises a conveyor 109 to transport the singulated items of produce to the reach envelope of the or each robot positioning apparatus 3.

The conveyor 109 may be described as a singulated conveyor 109 since the conveyor 109 supports each item of produce to be sufficiently spaced apart from adjacent items of produce to allow the robot positioning apparatus 3 and end effector 1 to pick up an individual item of produce without contacting adjacent items of produce.

The singulated conveyor 109 comprises a continuous conveyor loop or belt 110 carrying a plurality of holders 108.

The holders 108 are spaced apart in a conveying direction (y direction) along the conveyor belt 110.

In the illustrated embodiment the singulated conveyor comprises holders 108 spaced apart in the conveying direction along the conveyor belt 110 and orthogonal to the conveying direction across the conveyor belt (x direction) to be spaced apart in two dimensions to present the items of produce to the robot positioning apparatus and end effector in a 2-dimensional array.

Each holder 108 holds a single individual item of produce and represents a position on the conveyor (or in the 2-dimensional array).

In some embodiments, one or more people may place items of produce onto the holders 108 of the conveyor 109. However, in the illustrated embodiment, the singulation unit 101 comprises an infeed conveyor 102 and a plurality of line dividers 103.

The infeed conveyor may comprise one or more conveying apparatuses such as a conveyor belt to move the produce in a conveying direction.

The infeed conveyor 102 conveys the produce towards the line dividers 103 (FIG. 2) to separate the produce into at least one column or lane of produce, and preferably a plurality of adjacent columns of produce to correspond to the number of holders 108 spaced apart across the singulated conveyor 109.

The produce continues to be conveyed on the infeed conveyor 102 along columns defined by the line dividers 103 towards a separating device 104.

The separating device is configured to space the items of produce apart in a longitudinal or conveying direction (so that each item of produce is received onto a holder 108 of the singulated conveyor.

Once each item of produce has been placed onto a holder 108 it has been singulated from the other items of produce and ready to be subsequently picked up by the robot positioning apparatus with end effector.

An example singulation unit 101 comprising an infeed conveyor 102, line dividers 103, separating device 104 and singulated conveyor 109 with holders 108 is described in WO 2021/201702, the entire contents of which is incorporated herein by reference.

The robot positioning apparatus 3 may comprise an articulated robotic arm or other apparatus capable of moving the end effector in a 3-dimensional space.

The robot positioning apparatus 3 provides at least three degrees of freedom of movement, so that the robot positioning apparatus is adapted to move the end effector in x, y and z translational directions to position the end effector in a 3-dimensional space. In a most preferred embodiment, the robot positioning apparatus 3 provides at least four degrees of freedom of movement, so that the robot positioning apparatus is adapted to move the end effector in x, y and z translational directions, and including at least one rotational direction (e.g. roll) to allow the end effector to rotated about a horizontal axis to be inverted.

For example, rotation about a horizontal axis may invert the tube so that the tube has an upside-down orientation (with the open lop end' of the tube facing substantially downwardly) or re-orienting the tube so the open lop end' now faces substantially vertically upwards.

The x direction may be a horizontal direction (e.g. across the conveyor), the y direction may be a horizontal direction orthogonal to the x direction (e.g. a conveying direction of the conveyor), and the z direction vertical.

Figure 5:
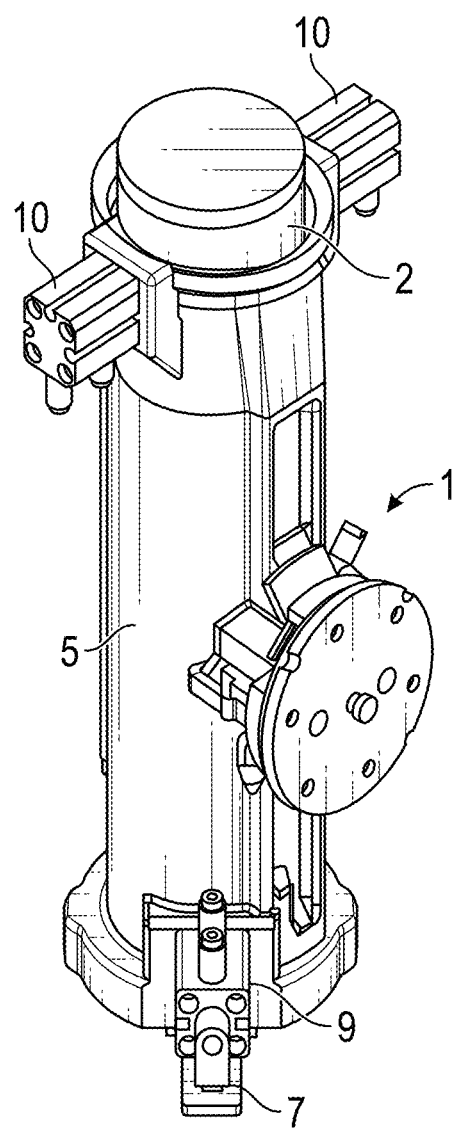
FIG. 5 illustrates an end effector configured to hold a tubular container in an inverted orientation and pick up items of produce to fill the tubular container held by the end effector.
Figure 6:
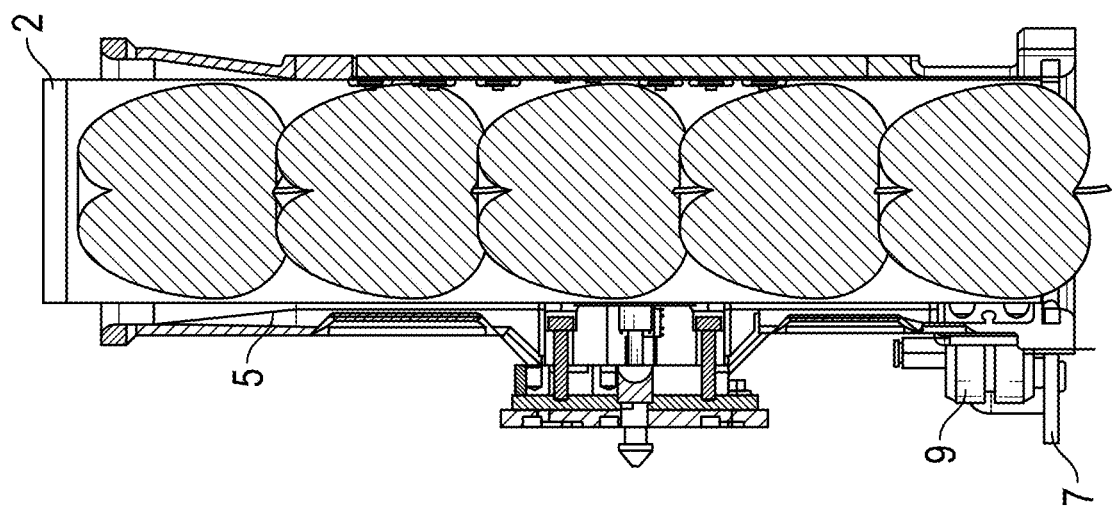
FIG. 6 is a cross sectional view of the end effector of FIG. 5 holding a tubular package that has been filled with apples.

With reference to FIGS. 5 and 6, in the preferred embodiment, the end effector 1 is adapted to hold an open topped tubular container 2 in an inverted orientation with an open top of the container presented downwards.

The end effector 1 has two actuatable movable elements 7 adjacent the open end of a tube 2 held by the end effector 1.

The actuatable movable elements 7 are configured to be operable between an extended position which at least partially extends over the open end of a tube 2 held by the end effector 1 to at least partially obstruct the open end of the tube, and a retracted position so that the open end 2 of the container is substantially unobstructed to allow items of produce to be received in the tube.

The end effector preferably also comprises a holding arrangement 10 configured to grip the tubular container, to hold the tubular container within the end effector 1.

A preferred end effector is described in co-pending patent application WO 2021/201702, the entire contents of which is incorporated herein by reference.

However, other end effectors arrangements may be utilised, for example to pick up and place produce in a tube that is not carried by the end effector.

Figure 12:
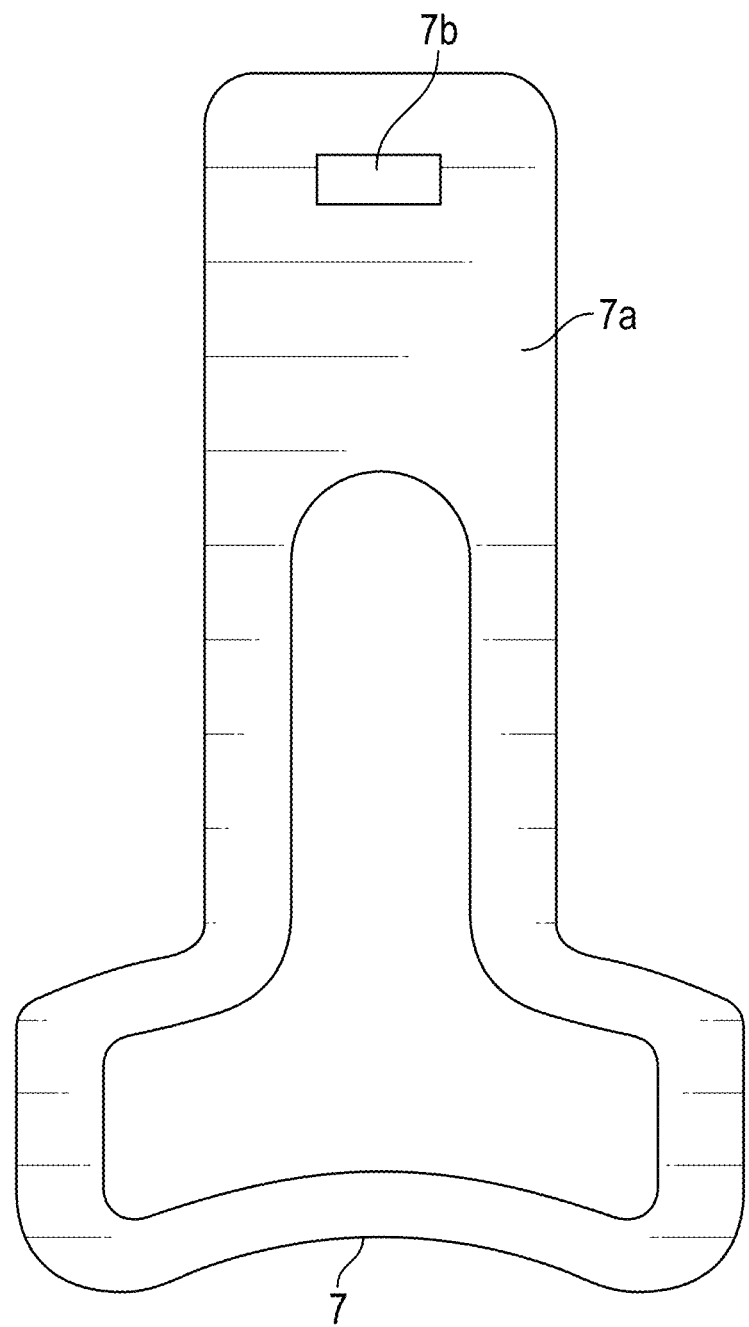
FIG. 12 shows a perspective view of a preferred actuatable element used on the end effector shown in FIGS. 5 to 7.

FIG. 12 shows an actuatable moveable element 7 which has an apple stop portion 7a which holds apples in the tube when the actuatable moveable element is in the extended position. The actuatable moveable element 7 has an aperture 7b which is used to connect the actuatable moveable element 7 to an actuator (not shown). In use, there are a pair of opposed actuatable moveable elements 7 each connected to it's own actuator. The actuatable moveable element 7 may be made from blue urethane or similar material.

Packing Operation

Figure 4:
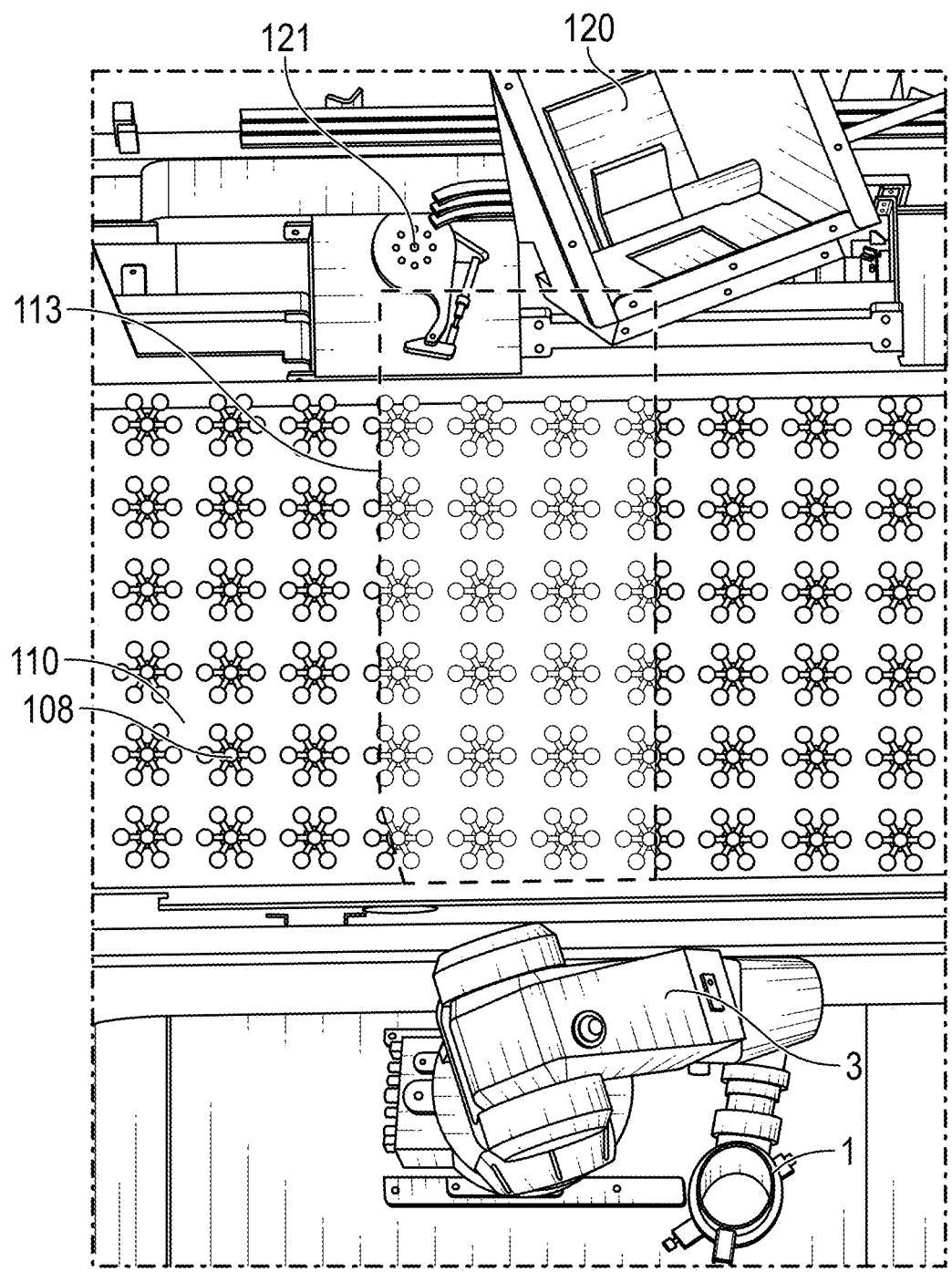
FIG. 4 illustrates a portion of the produce packing device of FIG. 1, including a robot positioning apparatus with end effector and with a tracking area of the robot positioning apparatus identified.

At the beginning of a packing operation a tubular container 2 (refer FIGS. 5-7) is received in a frame 5—of the end effector 1—which is substantially cylindrical in shape. For example, the robot positioning apparatus 3 may move the end effector 1 to a tube dispenser 120 (as shown in FIG. 4) to receive a tube 2 in frame 5 from the upper end or the lower end of the tube dispenser 120. Alternatively, a person may insert or place a tubular container into the frame 5 of the end effector 1.

A controller (for example a PLC) is provided to control movement of the robot positioning apparatus 3 and actuation of the end effector 1. The controller may be internal to, or external to (i.e., remotely located from), the robot positioning apparatus.

The robot positioning apparatus is controlled to first move the end effector 1—carrying a tubular container 2 in an inverted position—to be vertically above a selected item of produce located on a holder 108 on the conveyor 102. The robot positioning device may be moved in three axial directions (x, y, and z) or a combination of at least two of these axial directions in the nature of a vector direction.

The robot positioning apparatus is then controlled so the end effector 1 remains positioned vertically above the item of produce on the conveyor and thus keeps the end effector 1 moving in a conveying direction (direction y) at the same speed as the conveyor.

With the open end of the tubular container 2 positioned directly above the item of produce, the robot positioning apparatus 3 moves the end effector 1 vertically downwards over the item of produce, with the opposed pair of actuatable moveable elements 7 both in the retracted position to receive the item of produce in the tubular package 2 retained by the end effector 1. The actuatable moveable elements 7 are both driven by actuators 9.

Once received in the tubular package 2 the actuatable element is actuated to move from the retracted position to the extended position to retain the item of produce in the container 2, and the robot positioning apparatus 3 lifts the end effector and therefore item of produce from the holder 108.

If the next item selected to be packaged is adjacent the item which was just retained in the container, the robot positioning apparatus keeps moving in the conveying direction at the speed of the conveyor 109 and then moves laterally (i.e. in the x direction).

Once received in the end effector 1 and lifted from the holder 108 the robot positioning apparatus 3 can be subsequently controlled to move and accelerate as necessary to position the end effector 1 over a next, or further, item of produce to be packaged, and the vertical movement (i.e. the z direction) downwards and then upwards while simultaneously moving in the conveying direction, once aligned with the next item that has been selected for packaging, is repeated to pick up that item of produce.

To pick up a further item of produce, the robot positioning apparatus moves the end effector 1 vertically downwards so that a first or previous item of produce already received in tube is adjacent to or in contact with the further item of produce.

The actuatable moveable element 7 is actuated to move to the retracted position, and the end effector moves down to receive the further item of produce in the tube.

Once received in the tubular package 2 the actuatable element is actuated to move from the retracted position to the extended position to retain the first or previous item of produce and the further item of produce in the tube.

The robot positioning apparatus 3 lifts the end effector and therefore items of produce while still moving in the conveying direction at the speed of the conveyor 109.

Each next item of produce displaces the previous item of produce further into the container 2, as the end effector 1 and therefore package 2 is moved vertically downwards over the next item of produce.

The robot positioning apparatus 3 with end effector 1 continues to pick up further items of produce until the tubular container is full.

Preferably the robot positioning apparatus 3 with end effector continues to pick up items of produce with the end effector until a predetermined number of items of produce have been received in the tubular container 2.

Once the tubular container is full, the robot positioning apparatus may rotate the end effector 1 between the inverted orientation and an upright orientation. The robot positioning apparatus 3 moves the end effector 1 to a release area 121 (refer FIGS. 3 and 4) to release the tubular container 2 from the end effector 1.

The robot positioning apparatus 3 then lifts the end effector 1 off the tubular container 2. In the illustrated embodiment, the release area 121 is actuated to move the full package onto an exit conveyor 122 to transport the full package from the packing device 100.

Figure 7:
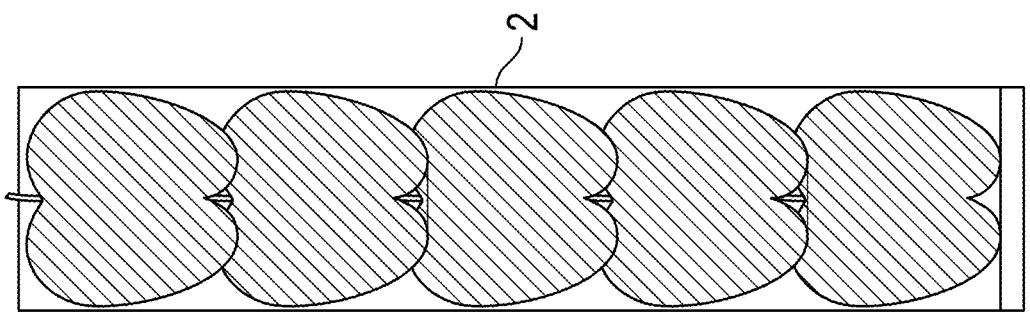
FIG. 7 is a cross sectional view of a tubular package containing five apples.

FIG. 7 illustrates a full tubular container or package containing five apples.

The tubular package has a closed end and an open end. A cap or lid (not shown) may be fitted to the open end of the tubular package to close the package and complete the packing operation.

In a packing operation, items of produce may not be packaged before reaching an end of the singulation conveyor 109. Any items of produce reaching an end of the conveyor may be collected and returned to the infeed conveyor 102 to be singulated again for packing. Items of produce may be collected in a container and returned to the infeed conveyor, for example by a person.

The produce packing device 100 comprises a sensor arrangement 111 to sense or detect each item of produce in the singulated items of produce on the singulated conveyor.

The device 100 comprises a controller with a memory in communication with the sensor arrangement 111. The controller is configured to store in the memory a datapoint of the position of each item of produce associated with a respective holder 108 holding the item of produce.

In a preferred embodiment the singulation unit 101 presents items of produce in a 2-dimensional array and the controller stores in the memory a datapoint for each position in the 2-dimensional array.

Each position may be represented by an x, y coordinate.

The controller tracks the position of each item of produce as the conveyor moves the singulated produce in a conveying direction.

The robot positioning device 3 moves the end effector 1 to a holder to collect the item of produce based on the datapoint for the item of produce associated with the holder.

The sensor arrangement 111 comprises a sensor to detect a dimension for each item of produce.

For example, the sensor may comprise a distance measurement sensor 112 (refer FIG. 3) to determine a distance between the sensor 112 and each item of produce from which a height measurement for each item of produce can be determined.

Preferably the sensor 112 detects the height of each item of produce in a row of items of produce on the conveyor one row at a time.

An example sensor is a time of flight sensor, for example sensor model no. O3D302 provided by IFM™.

The height for each item of produce is communicated to the controller. The controller tracks the position of the row on the conveyor as the row is conveyed in a conveyor direction of the packing device.

As the items of produce are singulated and held by the holders 108 of the conveyor in a known spaced relation across the conveyor, by tracking the position of the row as it advances along the conveyor the controller is configured to track the position of each item of produce in the row.

The controller determines which item of produce in each row to be picked up by the robot positioning apparatus 3 and end effector 1 to ensure a tubular package contains a correct number of items of produce in a single container and achieve a desired stack height of produce in the container.

Preferably the controller selects each item of produce to ensure that an amount of empty headspace within the tubular container will be within a desired or acceptable range, once the tubular container has the desired number of items of produce therein.

This selection process helps ensure the items of produce within the container will not roll around or move excessively within the container, during transit, to avoid damage to:
- the produce and/or
- maintain the produce in a desired orientation within the container 2, for example to present a blush (red) side of an item of produce (e.g. an apple) or other desirable characteristic of an item of produce through a see-through side wall of the container.

It will be appreciated that dimension measured by the sensor may be height or width. For example if the items of produce are substantially spherical in nature, or otherwise have a relatively symmetrical shape in terms of the x, y and z axes, width can be used in the assessment of stack height.

Figure 8:
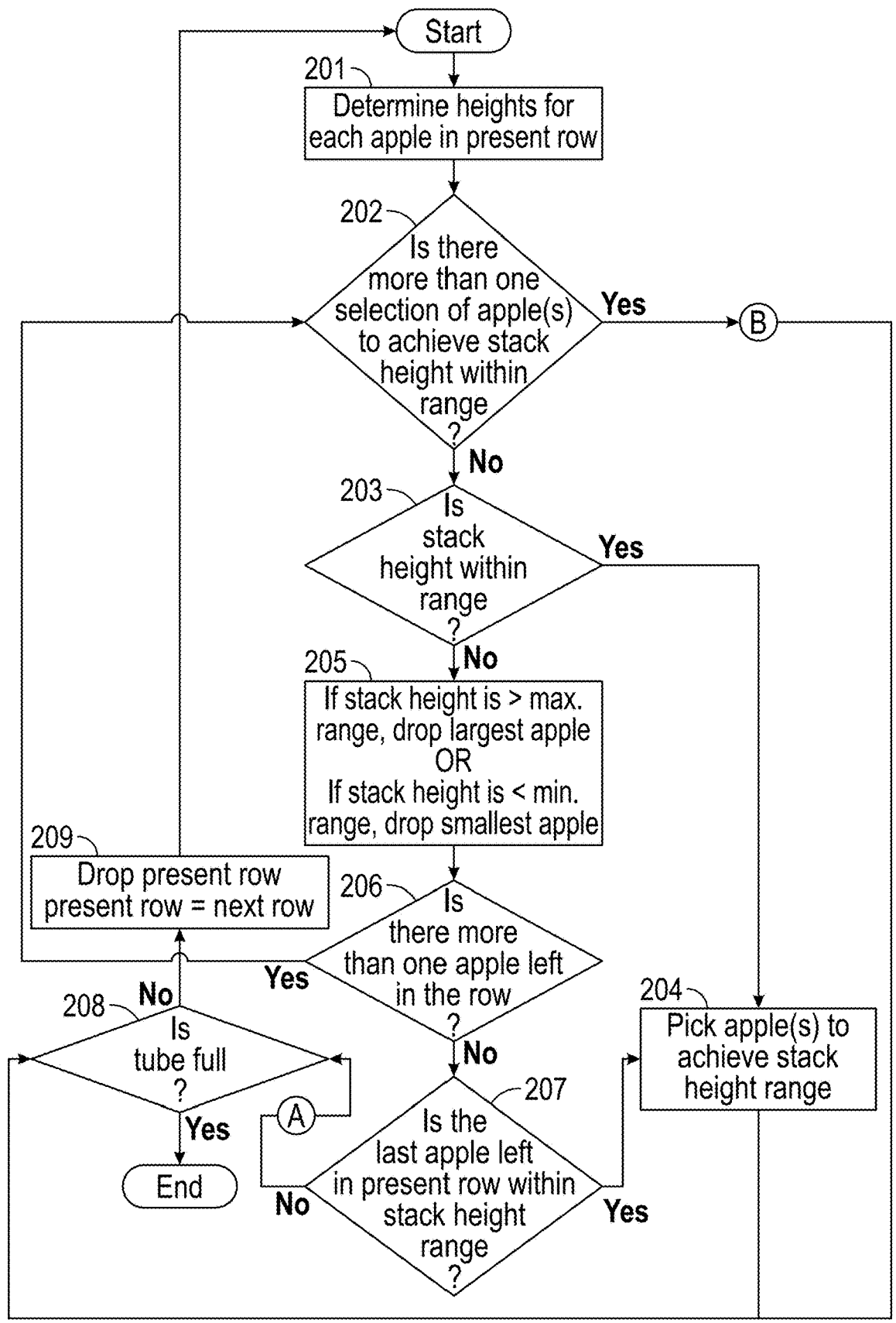
FIGS. 8 to 10 are flow charts illustrating a packing operation performed by the produce packing device of FIGS. 1 to 4.

A preferred method or sequence of steps that the packing device implements for determining which item of produce to pick to achieve a desired stack height of produce within a single container is now described with reference to FIGS. 8 to 10. Stacking apples in a tube is provided by way of example, however, the method or sequence of steps may be used to package other types of produce The method involves packing items of produce according to a desired or acceptable stack height. The desired or acceptable stack height is defined by an acceptable minimum stack height, a target stack height and an acceptable maximum stack height. A minimum, target and maximum stack height is defined for each item of produce as the tube is filled, i.e. once packaged each item of produce assumes or is located at a position within the tube, and there is a minimum, target and maximum stack height for each position in the tube. For example, for a 5-apple tube, the following example minimum, target and maximum stack heights (in millimetres) are provided which take into an acceptable headspace for the tube once filled with apples:

| Items of produce | Minimum stack height mm | Target stack height mm | Maximum stack height mm |
| --- | --- | --- | --- |
| First item of produce | 40 | 50 | 60 |
| Second item of produce | 90 | 100 | 110 |
| Third item of produce | 140 | 150 | 160 |
| Fourth item of produce | 190 | 200 | 210 |
| Fifth item of produce | 240 | 250 | 260 |

In this particular example, the tubular package may have a length of around 260 mm, such that the headspace at the end of the tube is a maximum of 20 mm in length.

As described above, the controller receives one or more outputs from the sensor 112 indicative of the size (i.e. the height) of each apple in a row. With reference to FIG. 8, at step 201, the controller determines from the one or more outputs from the sensor 112 a height measurement for each apple in a present row of apples on the conveyor. The row is a sub-set of items of produce in a plurality of items of produce presented to the robot positioning apparatus. The controller tracks the present row as the row is conveyed along the conveyor.

FIG. 4 illustrates a tracking window 113 in which the controller tracks one or more rows as the row(s) (or sub-sets of items of produce) move along the conveyor.

At step 202, the controller evaluates the heights of the apples in the present row of apples, to determine if there is one or more choices of a selection of one or more apples in the row to achieve a stack height within the acceptable stack height range of the minimum to maximum stack height.

If there is not more than one choice of a selection of apple(s) to achieve a stack height within the acceptable stack height range, at step 203 the controller assesses if there is a single selection of one or more apples to achieve an acceptable stack height range.

If there is a selection of one or more apples to achieve the acceptable stack height range, then at step 204 the controller causes the robot positioning apparatus and end effector to pick the one or more apples to achieve a stack height within the acceptable stack height range.

At step 208, the controller evaluates the apples added to the tube to determine if the tube is full. If the tube is full, the packing operation is completed, and the controller causes the robot positioning apparatus to move the end effector to the release area 120 and release the full tube from the end effector.

The controller may cause the robot positioning apparatus with end effector to pick up a new empty tube and commence a new packing operation.

If the tube is not full, at step 209 the controller 'drops' the present row, since the controller has completed its evaluation of the present row, and selects the next row on the conveyor to become the present row for evaluation, and the controller returns to the beginning of the method to repeat the method to continue to fill the tube within the desired stack limit range.

At step 203, if there is no selection of apples that achieves a stack height within the acceptable range, then at step 205, if the stack height is greater than the maximum stack height, the controller 'removes' or 'drops' (i.e. the controller disregards) the largest apple from the controller's evaluation of the present row of apples, or, if the stack height is less than the minimum stack height, the controller 'removes' or 'drops' (i.e. the controller disregards) the smallest apple from the controller's evaluation of the present row of apples.

At step 206, the controller determines if there is more than one apple available for selection left in the row.

If there is more than one apple left for evaluation in the row, the controller returns to step 202.

At step 202, the controller again evaluates the apples remaining in the row for selection.

For example, if the controller has presently dropped one apple from the row and the tube presently contains zero apples, the acceptable stack height range is 190 mm to 210 mm. Again, if there is not more than one choice of a selection of apple(s) to achieve a stack height within the stack height range, the controller repeats steps 203, 205 and 206 until a stack height of apples remaining in the row is within the acceptable range and the controller moves to step 204, or there is only one apple left in the row for evaluation and the controller moves to step 207.

At step 207, if the last apple left for evaluation in the present row is within the acceptable stack height range, the controller causes the robot positioning device and end effector to pick up the apple at step 204.

At step 208, if the tube is full the packing operation is completed, otherwise, at step 209, the controller selects the next row on the conveyor to become the present row for evaluation, and the controller returns to the beginning of the method to repeat the method to continue to fill the tube within the acceptable stack limit range.

Figure 9:
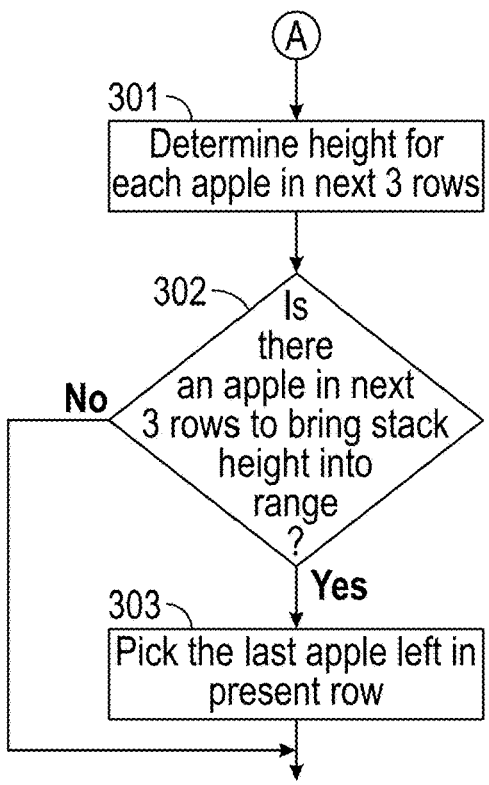

At step 207, if the last apple left for evaluation in the present row is outside the stack limit range, then, with reference to FIG. 9, at step 301, the controller determines from the one or more outputs from the sensor 112 a height measurement for each apple in the next three rows on the conveyor, and at step 302, evaluates the heights of the apples in the next three rows to determine if there is an apple in the next three rows to bring the stack height back into the acceptable stack height range. If there is an apple in the next three rows to bring the stack hight back into range, at step 303 the controller causes the robot positioning apparatus and end effector to pick the last apple from the present row.

Moving through step 208 to step 209, the controller selects the next row on the conveyor to become the present row for evaluation, and the controller returns to the beginning of the method to repeat the method to continue to fill the tube within the acceptable stack limit range.

While in the described embodiment, at step 207, the controller evaluates the apple heights in the next three rows to try and locate an apple to bring the stack height back into range, one skilled in the art will understand that in some embodiments, the controller may evaluate the next row only, or the next two rows, or the next three rows, or more than the next three rows to try and locate an apple to bring the stack height back into range. Evaluating the next three rows is provided by way of example only.

Figure 10:
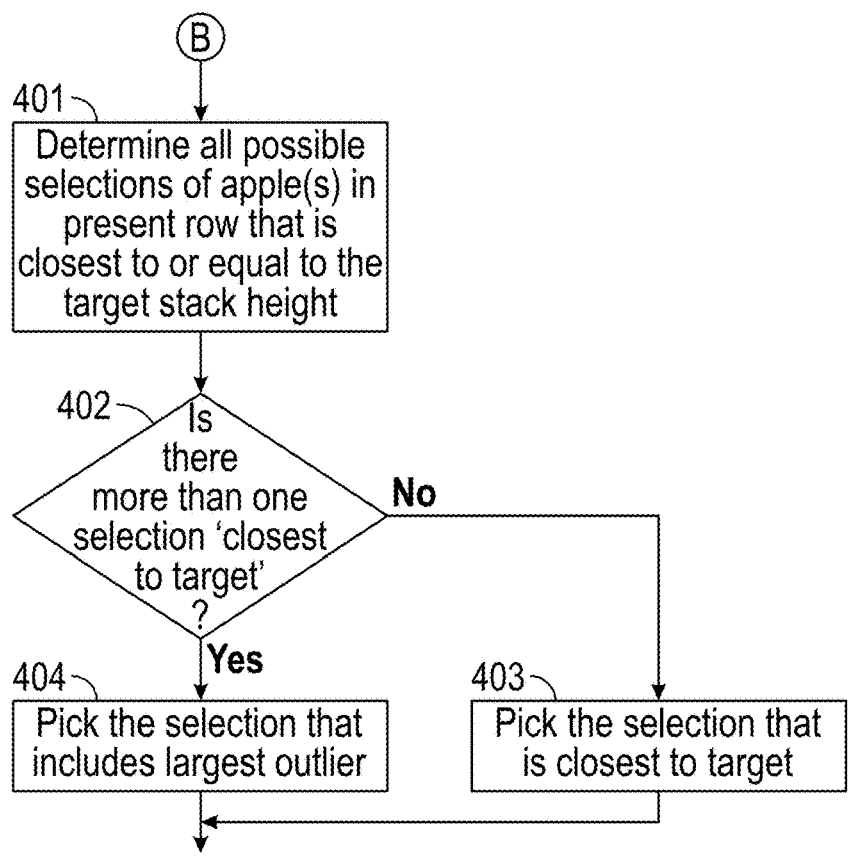

At step 202, if the controller determines there is more than one choice of a selection of one or more apples from the present row of apples to achieve the acceptable stack height, then, with reference to FIG. 10, at step 401 the controller evaluates the present row of items of produce and determines which of the selections of one or more items of produce in the present row is the closest to, or is equal to, the target stack height.

At step 402 the controller determines if there is more than one selection of one or more apples that is the closest to or is equal to the target stack height.

For example, the controller may determine a stack height that is the closet to, or is equal to, the target stack height, or if the measured stack height is equal to the target stack height plus or minus a threshold.

The threshold may be product specific and/or adjustable, e.g. expressed as a percentage of the stack height limit. If there is only one selection of one or more apples that is the closest to or equal to the target, then at step 403 the controller causes the robot positioning apparatus with end effector to pick up the selection of items of produce that has a stack height that is the closest to, or equal to, the target stack height.

At step 402, if there is more than one selection of items of produce with a stack height that is the closest to or is equal to the target stack height, the controller causes the robot positioning device to pick up the selection of items of produce that includes the largest outlier, that is the largest or smallest item of produce of the selections of items of produce that have a stack height within the acceptable stack height range. The controller may determine an 'outlier score' for each item of produce. The outlier score may be based on a difference between the actual size (height) of an item of produce and a nominal size (height).

The outlier score may be the difference between the actual size (height) of an item of produce and a nominal size (height) to the power of 2.

Again, with reference to the above example, the nominal size item of produce is 50 mm. For an item of produce size of 55 mm, the outlier score is 25.

The step of picking up the selection of items of produce with the largest outlier is useful where the produce packing device 100 includes more than one robot positioning device with end effector, as removing the largest outlier item of produce from the produce to be packed improves the likelihood of the next robot positioning device with end effector successfully filling a tube within the desired stack height range.

As described above, once the controller has caused the robot positioning apparatus with end effector to pick up a selection of apples to achieve the stack height target or range, at step 208, the controller determines if the tube is full.

If the tube is full, the packing operation is completed, and the controller causes the robot positioning apparatus to move the end effector to the release area 120 and release the full tube from the end effector. The controller may cause the robot positioning apparatus with end effector to pick up a new empty tube and commence a new packing operation. The controller then sets the next row on the conveyor to become the present row for evaluation and repeats the method for filling the new tube.

If the tube is not full, at step 209 the controller 'drops' the present row, since the controller has completed its evaluation of the present row, and selects the next row on the conveyor to become the present row for evaluation, and the controller returns to the beginning of the method to repeat the method to continue to fill the tube within the acceptable stack height range.

Figure 11:
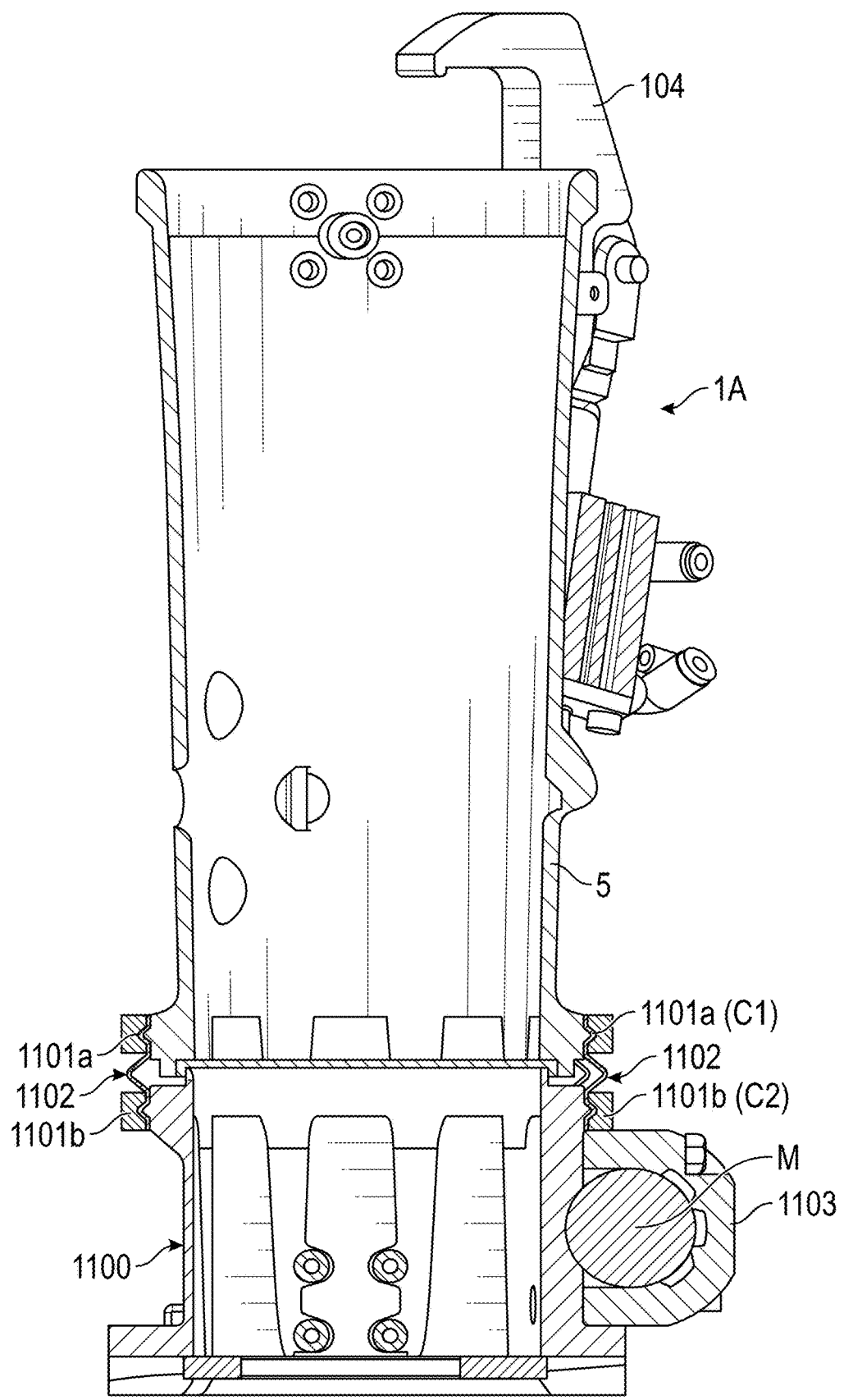
FIG. 11 shows an effector which includes a vibrating mechanism thereon in accordance with preferred embodiment of the present invention.

FIG. 11 is a cross-sectional view of a preferred 'outlier' end effector 1A which can handle 90% of fruit to be packaged in a tube except for the remaining 10% of upper and lower outliers from the general population of fruit to be packaged.

This end effector 1 has a frame 5 which is attached to an outlier receiver section 1100 via a pair of collars 1101a, 1101b and a flexible joint 1102. The flexible joint may be made from thermoplastic or other suitable material.

The outlier receiver section 1100 has a vibration motor and housing 1103 which vibrates the outlier receiver section 1100 whilst it is receiving a new item of produce to be received and retained into the tube (not shown).

A further feature of this end effector 1A is a hook 1104 which helps correctly position a tube into the end effector 1A.

Example 1 Outlier Fruit

The inventors have found that in different growing seasons the uniformity of fruit size and/or shape for apples can vary—e.g. outlier apples can be long, squat, leaf or penguin shaped. These differences in size and shape from the average size/shape of an apple can cause difficulties with automated packaging of the apples directly into containers by the robot positioning device of the present invention.

In some cases, shape, size (diameter) and/or cuticle adhesiveness can cause jamming issues with placing apples into the tube.

The inventors have been able to overcome 90% of these issues by utilising a vibrating mechanism on the end effector which operates during the tube filling process to vibrate the tube.

FIG. 11 shows an end effector 1 which includes a motor M which rotates an eccentric mass to vibrate the tube 2. The motor M is attached to the frame of the end effector 1 via collars C1 and C2.

Assessing extreme outlier fruit which will not fit within the tube 2 is also achieved via a sensor system in the form of two Sick Inspector PIM60 smart 2D cameras (camera system) each simultaneously looking at three lanes L of the conveyor 109 upstream of the robot positioning apparatus 3.

The camera system can measure apple diameter on four diagonals across three apple positions with a Standard Deviation of 0.27 mm from the actual diameter.

Around 95% of the measurements will be less than 0.54 mm from the actual diameter. The apple orientation using the calyx/stem position was identified to be within 20 degrees of vertical.

This camera system is able to detect the outlier fruit to a tolerance of +/−0.5 mm. Using the equatorial diameter data generated by this vision system with the existing time of flight system, an elongation profile of each apple can be made. The Auto-packing machine can then decide to reject it or add it to its tube pick combination.

The sensor system of the present invention thus can take multiple measurements of an item of produce over a period of time to make a determination that it can fit within a tube. If the fruit cannot the fruit is identified. The sensor system can also assist with programming of the robotic positioning apparatus 3 so that it picks up the smallest fruit that will form a stack within a tube first with the largest fruit in the stack going into the tube last.

This approach helps mitigate stoppages in packaging operations due to jamming.

In some embodiments extreme outlier fruit may be picked up by additional downstream robotic positioning devices which have tubes of an appropriate oversized or undersized diameter tubes for receiving the extreme outlier produce.

Alternatively, or in addition, there may be one or more further additional downstream robotic devices for picking up rejected items of produce which will not fit within the tubes.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What we claim is:

1. A produce packing device comprising:
   a robot positioning apparatus with an end effector,
      wherein the robot positioning apparatus provides at least three degrees of freedom to move the end effector in three axial (x, y, and z) directions or combination of at least two of these directions with respect to items of produce to be packaged,
      wherein the end effector is configured to individually pick up an item of produce and at the same time place the item directly into a package in the form of a tube;
   a sensor to determine a size of each item of produce in a plurality of items of produce presented to the robot positioning apparatus and the end effector; and
   a controller configured to receive one or more outputs from the sensor and further configured to:
      determine a selection of items of produce to be picked from the plurality of items of produce based on the one or more outputs from the sensor to achieve an acceptable stack height of items of produce within a package; and
      cause the robot positioning apparatus and the end effector to move and pick up the selection of items of produce and place items of produce directly within said package.

2. The produce packing device as claimed in claim 1, wherein the acceptable stack height is defined by a target stack height and/or an acceptable stack height range, wherein the acceptable stack height range is from a minimum acceptable stack height to a maximum acceptable stack height.

3. The produce packing device as claimed in claim 2, wherein, once packaged, each item of produce assumes a position within the package, and an acceptable stack height range and/or target stack height is defined for the items of produce at each position within the package.

4. The produce packing device as claimed in claim 1, wherein the controller is configured to:
   (i) determine, based on the one or more outputs from the sensor, the size (height) of each item of produce in a present subset of the plurality of items of produce and determine from the present subset of the plurality of items, the selection of items of produce to be picked up by the robot positioning apparatus with the end effector.

5. The produce packing device as claimed in claim 4, wherein the produce packing device comprises a conveyor to convey the plurality of items of produce to the robot positioning apparatus and the present subset of the plurality of items of produce is a row of items of produce spaced apart across the conveyor.

6. The produce packing device as claimed in claim 5, wherein the controller is configured to track a row of items of produce as the row is conveyed along the conveyor.

7. The produce packing device as claimed in claim 5, wherein the controller is configured to determine the size of each item of produce in more than one row of items of produce, and track a row of items of produce as the row is conveyed along the conveyor.

8. The produce packing device as claimed in claim 4, wherein the controller is configured to:
   (ii) evaluate the size of the items of produce in the present subset to determine if there is one or more selections of one or more items of produce from the present subset to achieve a stack height within an acceptable stack height range; and
   (iii) if there is a single selection of one or more items of produce within the acceptable stack height range, the controller is configured to cause the robot positioning apparatus and the end effector to pick up the single selection of one or more items of produce.

9. The produce packing device as claimed in claim 8, wherein the controller is configured to:
   (iii)(b) if there is no selection of items of produce that is within the acceptable stack height range, and:
   (iii)(b)(i) if the stack height of the items of produce in the present subset is greater than a maximum acceptable stack height, the controller is configured to disregard the largest item of produce from the present subset, or (iii)(b)(ii) if the stack height of the items of produce in the present subset is less than a minimum acceptable stack height, the controller is configured to disregard the smallest item of produce from the present subset, and (iii)(c) if there is more than one item of produce left in the present subset, the controller is configured to return to step (ii).

10. The produce packing device as claimed in claim 9, wherein, in step (iii)(c) the controller is configured to:
   if there is only one item of produce left in the present subset, and
   (iii)(c)(i) if the last item of produce in the present subset is within the acceptable stack height range, the controller is configured to:
      cause the robot positioning apparatus and the end effector to pick up the last item of produce in the present subset.

11. The produce packing device as claimed in claim 10, wherein, in step (iii)(c) the controller is configured to:
   (iii)(c)(ii) if the last item of produce in the present subset is outside the acceptable stack height range, the controller is configured to:
      (iii)(c)(ii)(a) determine, based on the one or more outputs from the sensor, the size (height) of each item of produce in one or more next subsets to determine if there is an item of produce in the one or more next subsets to achieve, together with the last item of produce, a stack height within the acceptable stack height range, and
      (iii)(c)(ii)(a)(i) if there is an item of produce in the one or more next subset(s) to achieve, together with the last item of produce, a stack height within the acceptable stack height range, the controller is configured to:
         cause the robot positioning apparatus and the end effector to pick up the last item of produce in the present subset, and
      (iii)(c)(ii)(a)(ii) if there is no item of produce in the one or more next subset(s) to achieve, together with the last item of produce, a stack height within the acceptable stack height range, the controller is configured to:
         set a next subset in the plurality of items of produce to be the present subset and returns to step (i).

12. The produce packing device as claimed in claim 8, wherein, following step (ii), if there is more than one selection of one or more items of produce from the present subset to achieve a stack height within an acceptable stack height range, the controller is configured to:
   (iv) determine if one or more of the selections of one or more items of produce achieves a stack height that is the closest to or is equal to a target stack height, and
   (iv)(a) if there is only one selection of one or more items of produce that achieves a stack height that is the closest to or equal to the target stack height, the controller is configured to cause the robot positioning apparatus and the end effector to pick up that selection; and
   (iv)(b) if there is more than one selection of one or more items of produce that achieves a stack height that is the closest to or equal to the target stack height, the controller is configured to cause the robot positioning apparatus and the end effector to pick up the selection with the largest item of produce or smallest item of produce.

13. The produce packing device as claimed in claim 12, wherein a stack height of a selection of one or more items of produce is equal to the target stack height if the stack height of the selection is equal to the target stack height plus or minus a threshold.

14. The produce packing device as claimed in claim 8, wherein, after the controller causes the robot positioning apparatus to pick up a said selection of one or more items of produce, the controller is further configured to:
   (v) determine if the package is full, and
   (v)(a) if the package is not full, the controller is configured to set a next subset in the plurality of items of produce to be the present subset and return to step (i) to continue filling the package.

15. The produce packing device as claimed in claim 14, wherein the end effector is configured to hold the package and places the item of produce therein as a consequence of the end effector picking up said item of produce, and wherein, in step (v):
   (v)(b) if the package is full, a present packing operation is completed, and the controller is configured to cause the robot positioning apparatus to move the end effector to a release area and release the full package from the end effector.

16. The produce packing device as claimed in claim 15, wherein the controller is configured to:
   (v)(c) cause the robot positioning apparatus to move the end effector to a package dispenser to receive an empty package in the end effector, and
   set a next subset in the plurality of items of produce to be the present subset and return to step (i) to commence filling the empty package.

17. The produce packing device as claimed in claim 1, wherein the end effector is configured to hold the package and places the item of produce therein as a consequence of the end effector picking up said item of produce, and the end effector comprises:
   at least one actuatable movable element located on the end effector so as to be adjacent to an open end of a tube held by the end effector; wherein the at least one actuatable movable element is configured to be operable between:
      an extended position which at least partially extends over the open end of a tube held by the end effector to at least partially obstruct the open end of the tube; and
      a retracted position so that the open end of a container is substantially unobstructed to allow items of produce to be received in the tube; and
   wherein, to pick up an item of produce, the controller is configured to, with the at least one actuatable movable element in the retracted position, with an empty tube to be filled, as follows:
   A) control the robot positioning apparatus to position the end effector, in at least:
      x and y directions; or
      a combination thereof;
      so as to be vertically above a first item of produce of a said selection of one or more items of produce; and move the end effector vertically downwards to receive the first item of produce in the tube within the end effector, and
   B) actuate the at least one actuatable movable element from the retracted position to the extended position to retain the first item of produce in the package, and
   C) cause the robot positioning apparatus to move the end effector vertically upwards to thereby pick up the item of produce.

18. The produce packing device as claimed in claim 17, wherein the controller is further configured to:
D) cause the robot positioning apparatus to move the end effector in the x and y directions to position the end effector vertically above a further item of produce in the selection of one or more items of produce, and move the end effector vertically downwards to position the first item of produce adjacent or in contact with the further item of produce;
E) actuate the at least one actuatable movable element from the extended position to the retracted position;
F) control the robot positioning apparatus to continue to move the end effector vertically downwards to receive the further item of produce in the package within the end effector;
G) actuate the at least one actuatable movable element from the retracted position to the extended position to retain the first item of produce and the further item of produce in the package, and
H) cause the robot positioning apparatus to move the end effector vertically upwards, and
F) repeat steps D) to H) until the robot positioning apparatus and the end effector has picked up the selection of one or more items of produce.

19. The produce packing device as claimed in claim 17, wherein the produce packing device comprises a conveyor to convey the plurality of items of produce to the robot positioning apparatus with the end effector, and a subset of items of produce is a row of items of produce spaced apart across the conveyor, and wherein, to position the end effector vertically above an item of produce, the controller is configured to:
to cause the robot positioning apparatus to move the end effector vertically above an item of produce and move in a conveying direction at a speed of the conveyor so that the end effector remains vertically above the item of produce.

20. The produce packing device as claimed in claim 1, wherein the end effector is configured to hold the package and places the item of produce therein as a consequence of the end effector picking up said item of produce.

21. The produce packing device as claimed in claim 1 further comprising a singulation unit to space apart the items of produce and present singulated items of produce to a reach envelope of the robot positioning apparatus.

22. The produce packing device claimed in claim 21, wherein the singulation unit spaces the items of produce apart in a 2-dimensional array.

23. A method of packaging items of produce directly into a tube comprising:
a) sensing dimensional and shape data for items of produce, located on a conveyor, at discrete non-variable datapoint locations thereon, at a given point of time; and
b) evaluating the dimensional and shape data of the items of produce on the conveyor, as determined at step a), to identify whether there are one or more items on the conveyor, that will fit within internal dimensions of the tube and achieve a stack height within an acceptable height range, from a minimum acceptable stack height to a maximum acceptable stack height, for the tube;
c) using datapoint locations from step a) of identified items of produce to:
i) move a robot positioning apparatus so as to remain positioned directly above selected items of produce; and
ii) manipulate an end effector so the tube can receive and retain said items of produce therein.

24. A method of packaging items of produce as claimed in claim 23 further comprising:
d) repeating steps a) through c) as required until the tube is filled with a desired number of items of produce.

25. A method of packaging items comprising:
a) utilizing a robot positioning apparatus to manipulate an end effector thereon to pick up a discrete item of produce from a conveyor via an end effector holding a tube so as to deliver directly the discrete item of produce into the tube as a consequence of picking up the discrete item of produce after sensing dimension and shape of the discrete item of produce to ensure a stack height that fits within the tube.

26. A method of packaging items as claimed in claim 25 further comprising:
b) repeating step a) to pick up one or more further items of produce until the tube is full.

\* \* \* \* \*

UNITED STATES PATENT AND TRADEMARK OFFICE
CERTIFICATE OF CORRECTION

| | | |
|---|---|---|
| PATENT NO. | : 12,291,366 B2 | Page 1 of 1 |
| APPLICATION NO. | : 18/255456 | |
| DATED | : May 6, 2025 | |
| INVENTOR(S) | : Andrew Vernon Fowler | |

It is certified that error appears in the above-identified patent and that said Letters Patent is hereby corrected as shown below:

In the Specification

Column 10, Line 22, delete "open lop end'" and insert -- open 'top end' --.

Column 10, Line 23, delete "open lop end'" and insert -- open 'top end' --.

Column 13, Line 36 (approx.), delete "of produce" and insert -- of produce. --.

Column 15, Line 19, delete "stack hight back" and insert -- stack height back --.

In the Claims

Column 19, Claim 11, Line 24, delete "size (height) of each" and insert -- size of each --.

Column 19, Claim 11, Line 31, delete "next subset(s) to" and insert -- next subsets to --.

Column 19, Claim 11, Line 39, delete "next subset(s) to" and insert -- next subsets to --.

Column 20, Claim 15, Line 16 (approx.), delete "and places the" and insert -- and place the --.

Column 20, Claim 17, Line 57, delete "produce of a said" and insert -- produce of said --.

Column 21, Claim 18, Line 22, delete "F) repeat" and insert -- I) repeat --.

Column 21, Claim 20, Line 40, delete "and places the" and insert -- and place the --.

Column 22, Claim 21, Line 2, delete "reach envelope of" and insert -- reach an envelope of --.

Signed and Sealed this
Nineteenth Day of August, 2025

Coke Morgan Stewart
*Acting Director of the United States Patent and Trademark Office*